United States Patent
Ye et al.

(10) Patent No.: US 8,284,696 B2
(45) Date of Patent: Oct. 9, 2012

(54) TRACKING CUSTOMER EDGE TRAFFIC

(75) Inventors: Feng Ye, Raleigh, NC (US); Bo Feng, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 328 days.

(21) Appl. No.: 11/957,983

(22) Filed: Dec. 17, 2007

(65) Prior Publication Data
US 2009/0154373 A1 Jun. 18, 2009

(51) Int. Cl.
*H04L 12/56* (2006.01)
(52) U.S. Cl. .............. 370/253; 370/395.5; 370/466; 709/224
(58) Field of Classification Search .......... 370/252, 370/392, 394, 389, 469, 401, 390; 707/769; 709/224
See application file for complete search history.

(56) References Cited

U.S. PATENT DOCUMENTS

| | | | |
|---|---|---|---|
| 6,538,989 B1 * | 3/2003 | Carter et al. | 370/229 |
| 7,272,146 B2 | 9/2007 | Yamauchi | |
| 7,555,562 B2 * | 6/2009 | See et al. | 709/240 |
| 7,561,586 B2 * | 7/2009 | Wang et al. | 370/401 |
| 2001/0016914 A1 * | 8/2001 | Tabata | 713/201 |
| 2003/0142669 A1 * | 7/2003 | Kubota et al. | 370/389 |
| 2006/0026424 A1 * | 2/2006 | Eto | 713/165 |
| 2007/0115850 A1 * | 5/2007 | Tsuchiya et al. | 370/252 |
| 2009/0046720 A1 * | 2/2009 | Streijl et al. | 370/394 |
| 2011/0286456 A1 * | 11/2011 | Kompella | 370/390 |

* cited by examiner

*Primary Examiner* — Robert Wilson
*Assistant Examiner* — Mohamed Kamara
(74) *Attorney, Agent, or Firm* — Brinks Hofer Gilson & Lione

(57) ABSTRACT

In one embodiment, data from a first device is received. A second device is identified. A data flow is between the first device and the second device. A third device is identified as a function of at least one label of the data flow.

22 Claims, 4 Drawing Sheets

TRACKING CUSTOMER EDGE TRAFFIC

BACKGROUND

The present disclosure relates generally to data communication.

Companies, businesses, and individuals communicate between multiple sites and locations on a daily basis. Virtual private networks ("VPNs") are commonly used for such purposes. A VPN is a communications network tunneled through an existing network, such as the Internet or an intranet. As faster communications are desired, VPN technology advances to meet customer needs. For example, multiprotocol label switching ("MPLS") VPNs are utilized for better traffic isolation and performance. MPLS allows for transferring data between different points by switching or adding and removing labels on incoming and outgoing packets.

However, as such VPNs become more complex, customer visibility and tracking remains a focal point. Traffic data informs customers of overloading or underutilization of VPN devices, such as routers. Yet, tracking data between one VPN site through a provider network to another VPN site can be a tedious and complicated process.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DESCRIPTION OF EXAMPLE EMBODIMENTS

Overview

By way of introduction, the example embodiments described below include a data communication device and/or system and a method for tracking traffic between customer devices. The system includes a server operable to correlate flow between customer devices as a function of at least one label of the flow.

According to a first aspect, data from a first device is received. A second device is identified. A data flow is between the first device and the second device. A third device is identified as a function of at least one label of the data flow.

According to a second aspect, a server is operable to communicate with a router in a multi-protocol label switching ("MPLS") network. The server is further operable to identify an ingress customer edge router. The server is further operable to identify an egress customer edge router as a function of a label of flow between the ingress and egress customer edge routers.

According to a third aspect, logic, when executed, is operable to identify an ingress customer device. An egress customer device is identified as a function of at least one label of a data flow between the ingress and egress customer devices. Data indicative of occurrences of the flow between the ingress and egress customer devices is generated.

According to a fourth aspect, a first device is in a multi-protocol label switching ("MPLS") network. The first device is operable to receive a data flow from a second device. The first device is further operable to add an MPLS label to the data flow. The first device is further operable to transmit data, including the MPLS label, for identification of a third device.

The present invention is defined by the following claims, and nothing in this section should be taken as a limitation on those claims. Further aspects and advantages of the invention are discussed below in conjunction with the preferred embodiments.

Example Embodiments

In one example, a customer edge to customer edge traffic matrix is generated to provide crucial information for network capacity planning, network monitoring, and/or billing. The traffic matrix can be generated by correlating Netflow Data Export ("NDE") with other information from network devices. For example, a Netflow collector ("NFC") server collects NDE from an ingress provider edge router. The NDE captures a VPN label, an input interface ID, and an Internet protocol ("IP") address associated with a top label. An ingress customer edge router supplying a flow of data to the ingress provider edge router is identified by querying the ingress provider router, an IP Solution Center ("ISC"), and/or a user maintained configuration file. The top label IP address points out an egress provider router that directs the flow to an egress customer edge router. The VPN label is used to query the egress provider router to identify the egress customer router. Because the ingress and egress customer edge routers are identified per flow, a traffic matrix can be generated.

Figure 1:
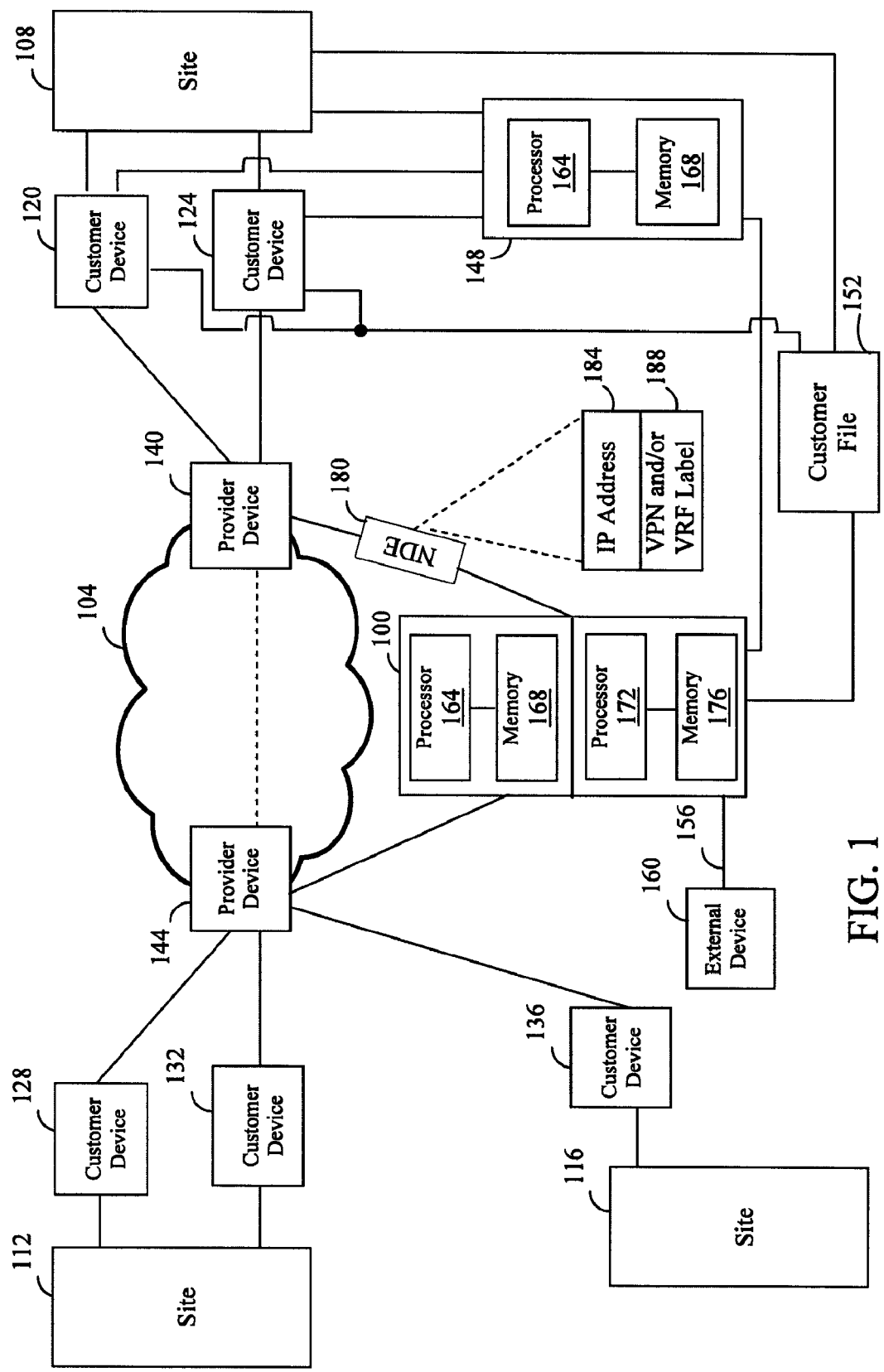
FIG. 1 illustrates one embodiment of a MPLS VPN system for tracking traffic between customer devices.

FIG. 1 shows one embodiment of a data communication system. The system, for example, is a MPLS VPN based system. The MPLS VPN system may utilize a MPLS layer 3 ("L3") VPN configuration. Other configurations may be used. The system includes, but is not limited to, a server 100, a provider network 104, VPN sites 108, 112, and 116, customer devices 120, 124, 128, 132, and 136, provider devices 140 and 144, an ISC 148, a customer file 152, a network connection 156, and an external device 160. Additional, different, or fewer components may be provided. For example, the customer file 152 may be a part of or separate from the server 100. Also, additional or less customer and/or providers devices, a proxy server, a switch or intelligent switch, a computer or workstation, administrative components, such as an administrative workstation, a gateway device, a backbone, ports, and network interfaces may be provided.

The server 100 is a software and/or hardware implementation. For example, the server 100 is an application program. Alternatively, the server 100 is a server computer or any other hardware that executes and runs server applications. A hardware implementation of the server 100 includes, but is not limited to, a processor 164 and a memory 168 as well as a processor 172 and a memory 176. Additional, different, or fewer components may be provided. The processor 164 is in communication with the memory 168. The processor 172 is in communication with the memory 176. The processors 164 and 172 as well as the memories 168 and 176 may be in communication with each other, more, fewer, or different components. The processor 164 and/or 172 is a general processor, application-specific integrated circuit ("ASIC"), digital signal processor, field programmable gate array ("FPGA"), digital circuit, analog circuit, or combinations thereof. The processor 164 and/or 172, is one or more processors operable to communicate with electronics of the server 100 or other components of the system. The processor 164 and/or 172 is operable to control the various electronics and logic of the server 100 and/or the system.

The memories 168 and 176 are any known or future storage devices. The memories 168 and 176 are a non-volatile and/or volatile memory, such as a Random Access Memory "RAM" (electronic), a Read-Only Memory "ROM" (electronic), or an Erasable Programmable Read-Only Memory (EPROM or Flash memory).

For example, the server 100 is a NFC server. Alternatively, the NFC server 100 is two or more separate servers in communication with each other and are implemented on separate or the same hardware. For example, the processor 164 and the memory 168 are included within a first tier NFC server and the processor 172 and the memory 176 are included within a second tier NFC server. The server 100 is operable to communicate with the provider devices 140 and 144. The server 100 may be in communication with different, more, of fewer devices or components of the system.

The server 100 is operable to receive NDE 180 from a provider device, such as the provider device 140. Based on the NDE 180, the server 100 is further operable to identify associated provider and customer devices, for example, via the first tier application. Also, the server 100 is operable to generate data as a function of traffic between the customer devices 120, 124, 128, 132, and 136, for example, via the second tier application. In one embodiment, the server 100 generates a matrix including quantity or traffic data of flow between the customer devices 120, 124, 128, 132, and 136.

The server 100 is operable to communicate with an external device 160 via a network connection 156. For example, the server 100 transmits or uploads traffic data to the external device 160. The external device 160 is a remote computer, server, workstation, database, or any other device operable to receive the traffic data. The external device 160 may include an input device and/or a display. Different, more, or fewer components may be provided. The input device is a button, keypad, keyboard, mouse, trackball, rocker switch, touch pad, or voice recognition circuit. The display is any mechanical and/or electronic display positioned for accessible viewing in, on, or in communication with the external device 160. For example, the display is a touch screen, liquid crystal display ("LCD"), a plasma display, or a cathode-ray tube ("CRT") display.

A customer may access the external device 160 to view traffic data in substantially real time or to view saved or recorded traffic data, such as a matrix for a given period of time. Alternatively, the external device 160 is a billing server operable to calculate cost associated with the flow between the customer devices. The network 156 is a local area network ("LAN"), a wide area network ("WAN"), or any other wired or wireless connection. Alternatively, the sever 100 is operable to communicate with the external device 160 via the MPLS VPN system.

The NDE 180 is data exported or transmitted to the server 100, and the data is indicative of a flow, such as, but not limited to, Netflow. The NDE 180 includes, but is not limited to, one or more VPN and/or virtual routing and forwarding ("VRF") labels 188 (hereinafter referred to as "VPN label 188") associated with the flow. For example, the VPN label 188 is an MPLS label. The VPN label 188 comprises data, such as numeric or alpha/numeric bits, sequences, or keys, that is utilized to determine a VPN routing path to a destination, such as a destination network, within a site. The NDE 180 also includes an IP address 184 that is associated with a top label and points to or is directed to the provider device corresponding to the VPN site related to the VPN label.

Figure 2:
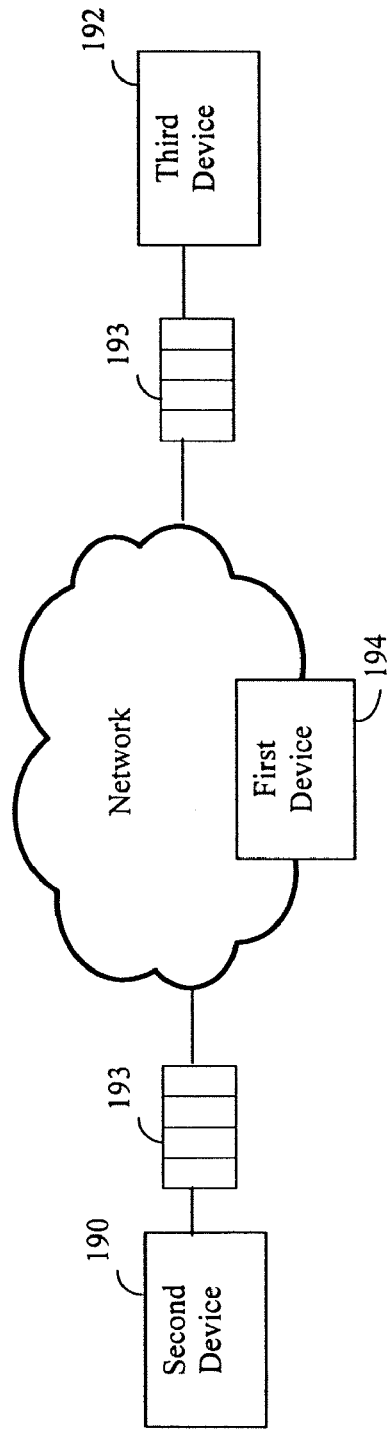
FIG. 2 illustrates one embodiment of data flow through a network.

The data flow or flow (hereinafter referred to as "flow") is a unilateral flow of data packets from one node within a VPN site to another node of another VPN site. For example, FIG. 2 shows one embodiment of flow 193 through a network, such as the network 104. The flow 193 includes a plurality of data packets identified by size, time, and/or any other flow indicator. The flow 193 is between a second device 190 and a third device 192. For example, the second device 190 and the third device 192 are customer edge routers, such as an ingress customer edge router and an egress customer edge router at different VPN sites, respectively. The flow 193 also passes through a first device 194 of the network. For example, the first device 194 is a provider edge router, such as an ingress provider edge router. The first device 194 is operable to add an MPLS label, such as the VPN label 188, to the flow 193.

Figure 3:
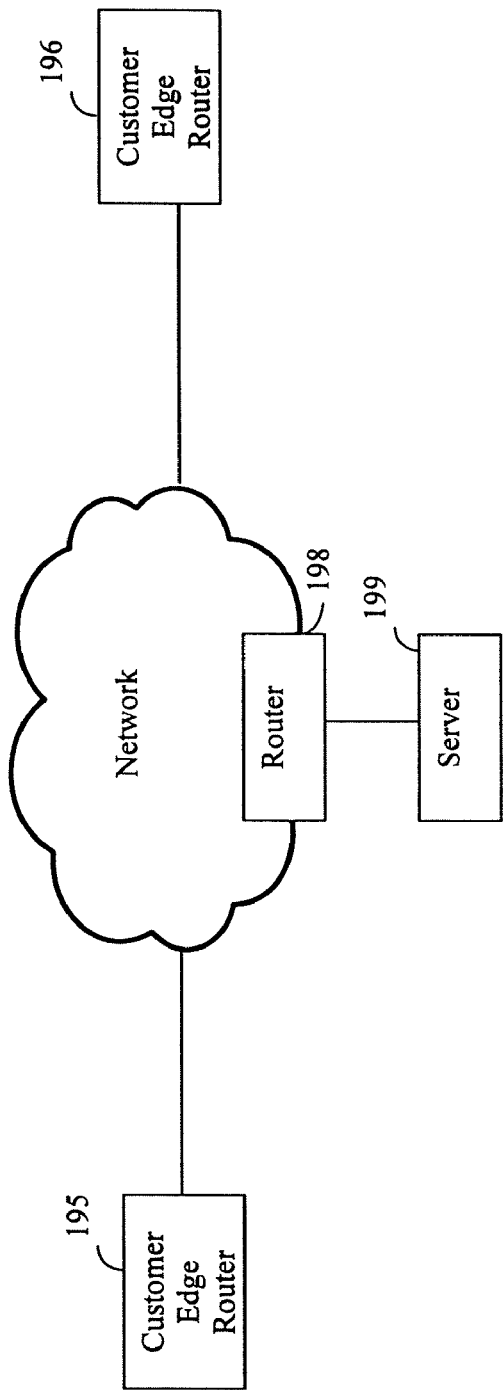
FIG. 3 illustrates one embodiment for identifying customer edge devices.
Figure 4:
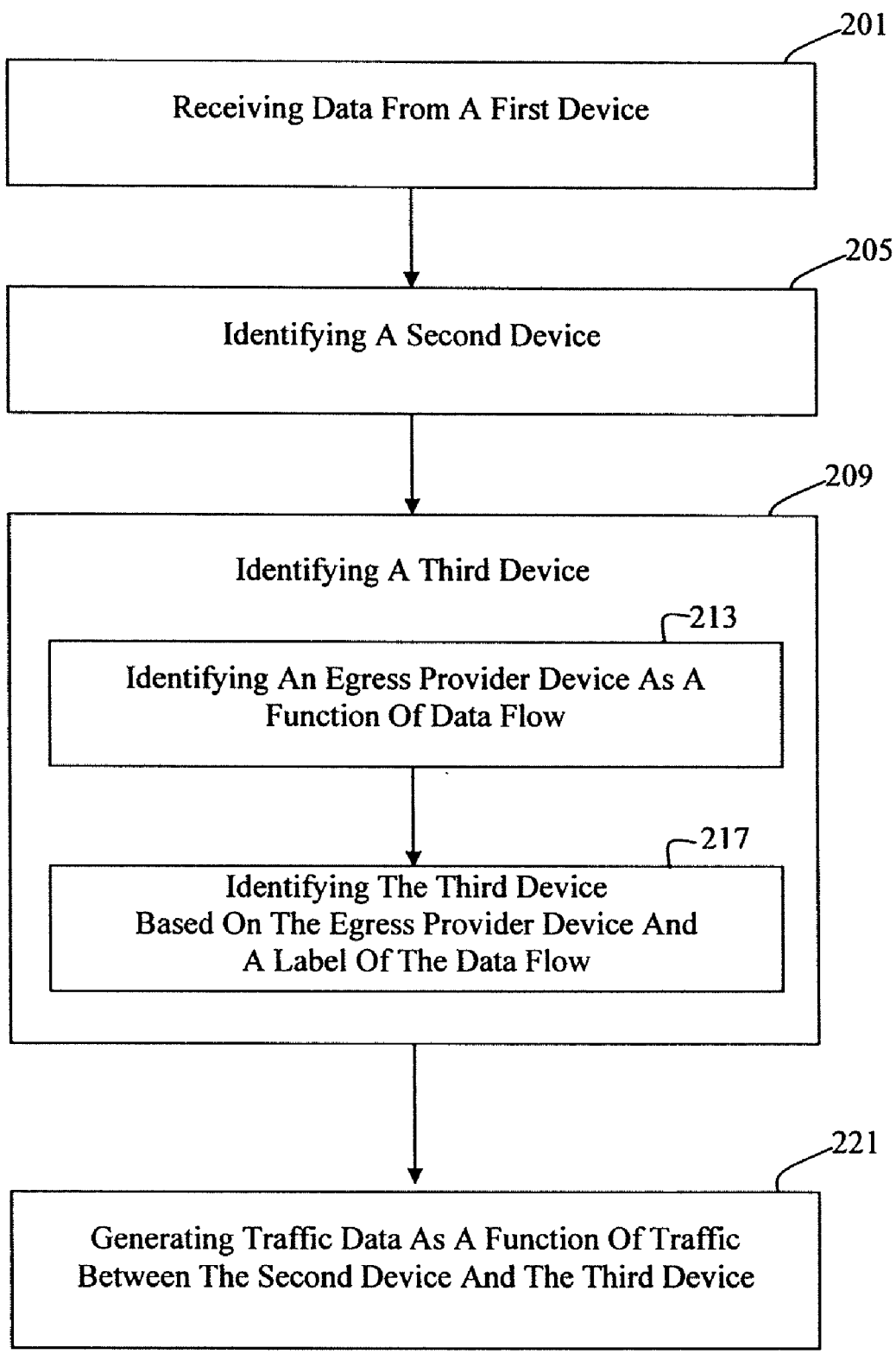
FIG. 4 illustrates one embodiment of a method for tracking traffic between customer devices.
Figure 5:
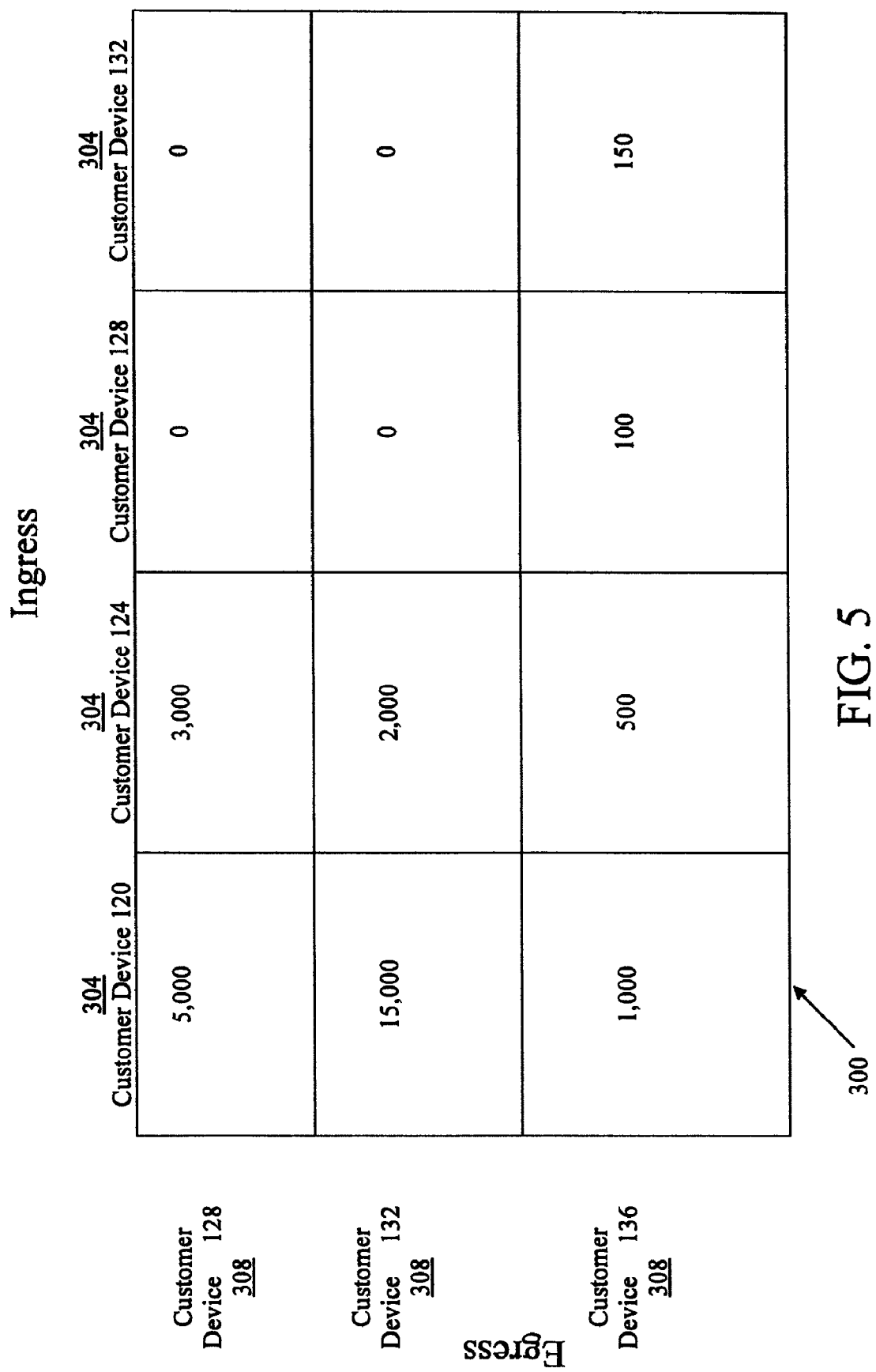
FIG. 5 illustrates one embodiment of a quantity or traffic data of flow between the customer devices of FIG. 1.

FIG. 3 shows one embodiment for identifying customer edge devices. For example, a router 198 is in a MPLS network. The router 198 is an ingress provider edge router, such as the first device of FIG. 2. The router 198 is operable to transmit data, such as the NDE 180 to a server 199, which may be similar to the server 100. The server 199 is operable to identify a customer edge router 195 and a customer edge router 196 as a function of a label of flow between the customer edge routers. For example, the label is similar to the VPN label 188, and the flow is similar to the flow 193.

Referring to FIG. 1, the server 100 is also in communication with the ISC 148 and/or the customer file 152. The ISC 148 is maintained by the provider and is operable to update and monitor VPN routes within the VPN sites. For example, the ISC 148 is in communication with the customer devices 120 and 124. Alternatively, the ISC 148 or a different IP solution center is in communication with other customer devices, such as the customer devices 128, 132, and 136.

The ISC 148, for example, is a software and/or hardware implementation of a server or multiple servers. A hardware implementation of the server includes, but is not limited to, a processor 192 and a memory 196. Additional, different, or fewer components may be provided. The processor 192 is in communication with the memory 196. The processor 192 and the memory 196 may be in communication with more, fewer, or different components. The processor 192 is a general processor, application-specific integrated circuit ("ASIC"), digital signal processor, field programmable gate array ("FPGA"), digital circuit, analog circuit, or combinations thereof. The processor 192 is one or more processors operable to communicate with electronics of the ISC 148 or other components of the system. The processor 192 is operable to control the various electronics and logic of the ISC 148 and/or the system.

The memory 196 is any known or future storage device. The memory 196 is a non-volatile and/or volatile memory, such as a Random Access Memory "RAM" (electronic), a Read-Only Memory "ROM" (electronic), or an Erasable Programmable Read-Only Memory (EPROM or Flash memory). Alternatively, the ISC 148 is an office or headquarters including multiple data communication devices.

In an alternative embodiment, a customer may maintain and be responsible for updating VPN routes within the VPN sites. For example, a customer file 152 is used to keep VPN route records as well as update VPN sites with different VPN routes over time. The customer file 152 is a software database or application. Alternatively, the customer file 152 is a server, workstation, or any other device operable to be maintained by a customer to monitor and update VPN routes for VPN sites. For example, the customer file 152 is part of or included in the server 100.

The provider network 104 is the Internet, an intranet, a local area network ("LAN"), a wide area network ("WAN"), and/or any known or future network. The provider network 104 includes the provider devices 140 and 144. Different, more, or fewer devices may be included in the provider network 104. For example, the provider devices 140 and 144 are ingress and/or egress provider edge routers, and the provider network 104 includes multiple internal provider routers and devices to transmit data within the network to the provider edge routers 140 and 144.

In one embodiment, a MPLS configuration is utilized by the provider network 104. When a flow enters the provider network 104 via a provider device, such as the provider device 140 or 144, MPLS labels are added or removed to direct the flow within the network. The provider device 140 and/or 144 is operable to be an ingress or egress provider edge router, switch, or any other edge device. For example, the provider edge routers 140 and 144 push an MPLS label onto an incoming packet of the flow and pop it off an outgoing packet the flow. Routers internal to the provider network 104 read the top label of the MPLS flow and add or remove more labels to eventually direct the MPLS flow to its destination. Labels are distributed between using a label distribution protocol ("LDP"). Routers in an MPLS network regularly exchange label and reachability information with each other using standardized procedures in order to build a complete picture of the network they can then use to forward flows.

The provider devices 140 and 144 are in communication with the customer devices 120, 124, 128, 132, and 136. For example, the customer devices are customer ingress and/or egress edge routers, switches, or any other edge device. The customer edge routers are the interface between a VPN site and the provider network 104. When the provider device 140 or 144 provides a flow to the customer edge router, the customer edge router directs the flow to the desired location within the site as a function of VPN routes. The VPN routes are predetermined and may be updated periodically. Multiple internal customer devices may be utilized to direct a MPLS flow to a location within a VPN site. Also, the customer edge routers provide a flow to an ingress provider edge router to send the flow to another VPN site.

The VPN sites 108, 112, and 116 are any geographic location including nodes, components, or devices in communication with each other via a VPN. For example, the VPN sites 108, 112, and 116 represent, individually, different regions of a country including multiple cities or towns, a city, a location within a city, or any other known or future VPN sites. The VPN sites may include nodes or workstations as well as applications used for business or personal communications.

FIG. 2 is a flowchart of one embodiment of a method for tracking traffic between customer devices. Fewer or more acts may be provided. The method is implemented by the system of FIG. 1 or a different system.

For example, a user at a workstation or other node in a VPN site, such as the site 108, decides to send data to another workstation or node at a different VPN site, such as the VPN site 112. The user utilizes an input device and/or user interface to transmit the data through a MPLS VPN system, such as the system of FIG. 1. The transmitted data includes multiple data packets forming a unilateral flow of data. The flow is directed or routed to an ingress customer edge device, such as the customer device 120 or 124. The flow is routed to the ingress customer edge device via one or more internal customer devices or switches corresponding to the VPN site transmitting the MPLS flow. The determination of which ingress customer edge device the flow is routed to is based on predetermined VPN routes. The predetermined VPN routes are established and can be modified or updated by a provider and/or customer maintaining the VPN. For example, the customer file 152 and/or the ISC 148 may be utilized to update or modify VPN routes.

A VPN label, such as the VPN label 188, is applied to one or more or all packets in the flow. An IP address, such as the IP address 184, is associated with a top label, such as an MPLS label. The top label, VPN label, which may be a second label in the stack, and IP address associated with the top label are applied to the flow by the ingress provider edge device. Fewer, more, of different labels or features may be applied to the flow. The IP address is used to determine an egress provider edge device, and the VPN label is used to determine an egress customer edge device.

For example, the ingress customer edge device sends the flow to an ingress provider edge device, such as the provider device 140. The ingress provider edge device processes and/or reads the flow and applies a VPN label and a top label to the flow. The ingress provider edge device then transmits the flow to the respective egress provider edge device as a function of the top label. The flow is provided to the egress provider edge device via one or more provider devices within a MPLS network, such as the network 104. For example, the ingress provider edge device adds or "pushes" a label on top of a VPN label and sends the flow to an internal provider device within the MPLS network. The internal provider device processes, reads, and/or views the IP address associated with the top label to determine what device to send the flow to within the MPLS network. After such determination, the internal provider device removes or "pops" the top label and adds or "pushes" a new top label on the flow. Any number of labels may be added or removed by any number of provider devices within the MPLS network. The flow is eventually routed to the egress provider edge device originally determined by the ingress provider edger device via the IP address.

When the egress provider edge device receives the flow, the top label is removed or "popped" and the VPN label is processed, view, and/or read. The egress provider edge device determines the respective egress customer edge device based on the VPN label and forwards the flow to the egress customer edge device. For example, the egress provider edge device removes or "pops" the VPN label before sending the flow to the egress customer edge device. The egress customer edge device forwards the flow to the desired destination within the VPN site. For example, the destination VPN site may use data, such as a flag bit, within the flow to route the flow to the desired network, workstation, and/or node via a predetermined VPN routing structure.

In act 201, data from a first device, such as the ingress provider edge device, is received. For example, the data comprises NDE, such as the NDE 180, and/or any other information. The NDE is received at a NFC server, such as the server 100, after or substantially at the same time when the ingress provider edge device receives the flow from the ingress customer edge device.

In act 205, a second device, such as the ingress customer edge device, is identified. For example, based on the NDE, the NFC server can query the ingress provider edge device to determine what customer edge device transmitted the flow to the ingress provider edge device. For example, the NFC server queries the ingress provider edge device to obtain or retrieve an input interface name. Then the NFC server or another device queries the ISC or customer file using the input interface name to determine or identify the ingress customer edge device.

Alternatively, the received data or NDE may contain information or data indicating the ingress customer edge device. Or, separate from querying the ingress provider edge device, the NFC server may query or consult the ISC and/or the customer file, which is used to maintain VPN routing, to determine the ingress customer edge device based on the NDE or other data indicative of the flow. The queries or commands include TCP, IP, or any other protocol commands.

In act 209, a third device, such as the egress customer edge device, is identified based on at least one label of the flow. For example, the egress customer edge device is the customer device 128 or 132. Identifying the egress customer edge device includes identifying the egress provider edge device and querying the egress provider edge device as a function of the VPN label of the flow.

For example, in act 213, the NFC server identifies a second provider device, such as the egress provider edge device or router, as a function of the flow. The NFC server processes, views, and/or reads the IP address associated with the top label of the flow from the NDE to determine the egress provider edge device. The NFC server may include a database or look-up table that correlates IP addresses to different provider edge devices. Alternatively, the NFC server queries the ingress provider edge device or another device with the IP address associated with the top label to identify the egress provider edge device.

In act 217, the third device, such as the egress customer edge device, is identified based on the egress provider edge device and a label of the flow, such as the VPN label. The NFC server queries the identified egress provider edge device using the VPN label to determine the egress customer edge device. For example, the NFC server sends a command line interface ("CLI") command, such as a telnet command, to the identified egress provider edge device based on the VPN label. The identified egress provider edge device includes a look-up table or database that correlates different egress customer edge devices to separate VPN labels. The identified egress provider edge device returns data indicative of the egress customer edge device to the NFC server based on the CLI command. Therefore, the ingress customer edge device and the egress customer edge device are known for the respective MPLS flow.

In act 221, traffic data as a function of the traffic between customer devices, such as the second device and the third device, is generated. For example, the NFC server counts or determines the number of unilateral flows between customer edge devices. For example, the flow described above between the ingress customer edge device and the egress customer edge device is one flow to be considered by the NFC server. The NFC server generates traffic data based on the number of flows between respective customer edge devices. The NFC server is operable to generate a traffic matrix, table, or any other representation of traffic flow data. The traffic data is generated as a function of a time period, for example, minutes, hours, days, weeks, months, or any other time period. The NFC server is operable to update or modify the traffic data. Also, the NFC server is further operable to send or transmit the traffic data to another device, such as the external device 160, devices within the VPN sites, or any other device, for viewing or further processing. For example, the traffic data is supplied to a customer for viewing or is supplied to a billing server for generating a bill.

FIG. 3 illustrates one embodiment of a quantity or traffic data of flow between the customer devices of the VPN MPLS system of FIG. 1 or a different system. For example, a traffic matrix 300 is generated by a NFC server, such as the NFC server 100. The traffic matrix includes columns 304 and rows 308. The columns 304 correspond to ingress customer edge devices, and the rows 308 correspond to egress customer devices. All or some of the customer devices 120, 124, 128, 132, and 136 may be either ingress or egress customer edge devices at different times. The traffic matrix 300 represents the number of flows between respective ingress and egress customer edge devices. More, fewer, or different customer edge devices and respective flow data may be provided. The data in the traffic matrix is based on time period, such as a day, week, month, or any other time period. Alternatively, the NFC server may generate and/or provide traffic data in formats other than a matrix, such as in a spreadsheet, a graph, or any other representation.

A provider may sell or give the traffic matrix 300 to a VPN customer on a fixed and/or periodic basis. Alternatively, the provider may allow the VPN customer to view the traffic matrix 300 substantially in real time or at a delayed time. The traffic matrix 300 may help the VPN customer to decide whether or not to add a new customer edge device or reconfigure VPN routes utilizing other existing customer edge devices. The VPN customer may recognize a "hot spot" or increased flow between certain customer edge devices. For example, the traffic matrix 300 shows that the number of flows between the ingress customer device 120 and the egress customer device 132 is 15,000, which may be higher than expected. Based on such information, the VPN customer may determine to address the increased traffic with or without the assistance of the provider.

The logic, software or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method comprising:
   receiving data from a plurality of ingress provider edge devices;
   identifying a plurality of ingress customer devices through querying a virtual private network configuration file, wherein the virtual private network configuration file maps one of the plurality of ingress provider edge devices and an input interface to each of the plurality of the ingress customer devices;
   identifying an egress customer device as a function of a virtual private network label for each of a plurality of data flows and a respective egress provider edge device;
   generating a two-dimensional traffic matrix based on the plurality of data flows between the plurality of ingress provider edge devices and the plurality of ingress customer devices, wherein the two-dimensional traffic matrix indicates traffic between the plurality of ingress customer devices and the respective identified egress customer device; and
   outputting billing information in the two-dimensional traffic matrix with the plurality of ingress customer devices along a first axis of the matrix and the respective identified egress customer device along a second axis of the matrix.

2. The method of claim 1, wherein the virtual private network label comprises a multi-protocol label switching label that is added to one of the lurality of data flows by one of the pluralityingress provider edge devices.

3. The method of claim 1, wherein the plurality of ingress provider edge devices comprises provider edge routers.

4. A method comprising:
   identifying a first customer device through querying a virtual private network file;
   identifying a second customer device as a function of at least one label of a data flow between a provider device and the first customer device;
   generating traffic data based on the data flow between the provider device and the first customer device, wherein the traffic data indicates traffic between the first customer device and the second customer device, wherein the first customer device comprises a first customer edge router corresponding to a first virtual private network site and the second customer device comprises a second customer edge router corresponding to a second virtual private network site, wherein generating the traffic data comprises generating a matrix including quantity data of a number of data flows between the first customer device and the second customer device; and
   outputting billing information in the matrix with the first customer device along a first axis of the matrix and the second customer device along a second axis of the matrix.

5. The method of claim 4, wherein identifying the second customer device comprises:
   identifying an egress provider router as a function of the data flow; and
   identifying the second customer device based on the egress provider router.

6. The method of claim 5, wherein identifying the egress provider router comprises identifying a first label in the data flow, and wherein the first label is associated with an Internet protocol address directed to the egress provider router.

7. The method of claim 5, wherein identifying the second customer device comprises querying the egress provider router as a function of a virtual private network label or a virtual routing and forwarding label of the data flow, the virtual private network label or the virtual routing and forwarding label added to the data flow by the provider device.

8. The method of claim 4, wherein identifying the first customer device comprises retrieving virtual private network content.

9. The method of claim 8, wherein retrieving the virtual private network content comprises querying an Internet protocol solution center.

10. An apparatus comprising:
    a server configured to communicate with an egress provider router in a multi-protocol label switching ("MPLS") network,
    wherein the server is further configured to identify an ingress customer edge router of a first virtual private network through communication with the egress provider router,
    wherein the server is further configured to identify an egress customer edge router of a second virtual private network as a function of a label of flow between the ingress and egress customer edge routers by way of the egress provider router;
    wherein the server generates traffic data including a quantity of data flows as a function of traffic between the ingress customer edge router and the egress customer edge router;
    wherein the traffic data including the quantity of data flows is formatted into a two-dimensional matrix including the ingress customer edge router on a first axis of the matrix and the egress customer edge router on a second axis of the matrix; and
    wherein billing information is output in the two-dimensional traffic matrix.

11. The apparatus of claim 10, wherein the label comprises a virtual private network label that is added to the flow by the egress provider router in the MPLS network.

12. The apparatus of claim 10, wherein the server comprises a Netflow collector server.

13. The apparatus of claim 10, wherein the server is further configured to identify the ingress customer edge router as a function of an ingress provider edge router.

14. The apparatus of claim 10, wherein the server is further configured to identify the egress customer edge router based on a query to an egress provider edge router as a function of a virtual private network label or a virtual routing and forwarding label.

15. Logic encoded in one or more non-transitory tangible media for execution by a processor configured to:
    identify a plurality of ingress customer devices through querying an ingress provider device;
    identify a plurality of egress customer devices as a function of labels of data flows between the plurality of ingress customer devices and the plurality of egress customer devices by way of the ingress provider device, wherein each data flow corresponds to a pair of customer devices comprising one of the plurality of ingress customer devices and one of the plurality of egress customer devices;
    generate a two-dimensional traffic matrix including a quantity of a data flow for each pair of customer devices for a predetermined time period; and
    output billing information in the two-dimensional traffic matrix.

16. The logic of claim 15, wherein to identify the egress customer device comprises:
  identify an egress provider device based on an Internet protocol address associated with a first label of the data flow; and
  identify the egress customer device based on the egress provider device.

17. The logic of claim 16, wherein the egress provider device is queried as a function of a virtual private network label or a virtual routing and forwarding label of the flow.

18. The logic of claim 15, wherein to identify the ingress customer device comprises to retrieve virtual private network content or query an ingress provider device.

19. The method of claim 4, wherein identifying the second customer device comprises:
  identifying an egress provider router as a function of the data flow;
  sending a command line interface to the egress provider router including the label; and
  receiving an identity of the second customer device accessed based on the label.

20. The method of claim 4, wherein the at least one label comprises a multi-protocol label switching label that is added to the data flow by the provider device.

21. The method of claim 4, wherein the provider device comprises a provider edge router.

22. The logic of claim 15, wherein the one of the plurality of ingress customer devices corresponds to a virtual private network, the logic further configured to:
  transmit the two-dimensional traffic matrix to an administrator of the virtual private network.

* * * * *

UNITED STATES PATENT AND TRADEMARK OFFICE
CERTIFICATE OF CORRECTION

PATENT NO. : 8,284,696 B2  Page 1 of 1
APPLICATION NO. : 11/957983
DATED : October 9, 2012
INVENTOR(S) : Feng Ye et al.

It is certified that error appears in the above-identified patent and that said Letters Patent is hereby corrected as shown below:

Column 9, Line 27, delete "lurality" and insert --plurality--.

Column 9, Line 28, insert --of-- between "plurality" and "ingress".

Signed and Sealed this
Fourth Day of December, 2012

David J. Kappos
*Director of the United States Patent and Trademark Office*